(12) United States Patent
Li et al.

(10) Patent No.: US 10,084,906 B2
(45) Date of Patent: Sep. 25, 2018

(54) MOBILE TERMINAL UNLOCKING METHOD AND DEVICE

(71) Applicant: Alibaba Group Holding Limited, Grand Cayman (KY)

(72) Inventors: Kai Li, Hangzhou (CN); Hongru Zhu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/565,253

(22) PCT Filed: Apr. 12, 2016

(86) PCT No.: PCT/CN2016/079027
§ 371 (c)(1),
(2) Date: Oct. 9, 2017

(87) PCT Pub. No.: WO2016/169419
PCT Pub. Date: Oct. 27, 2016

(65) Prior Publication Data
US 2018/0084106 A1    Mar. 22, 2018

(30) Foreign Application Priority Data
Apr. 20, 2015 (CN) .......................... 2015 1 0188757

(51) Int. Cl.
*H04M 3/16* (2006.01)
*H04M 1/725* (2006.01)
(Continued)

(52) U.S. Cl.
CPC ....... *H04M 1/72577* (2013.01); *H04W 4/008* (2013.01); *H04W 4/80* (2018.02);
(Continued)

(58) Field of Classification Search
None
See application file for complete search history.

(56) References Cited

U.S. PATENT DOCUMENTS

| 8,235,529 B1 | 8/2012 | Raffle et al. |
| 8,918,741 B2 | 12/2014 | Lindberg et al. |
(Continued)

FOREIGN PATENT DOCUMENTS

| CN | 102244699 A | 11/2011 |
| CN | 102568184 A | 7/2012 |
(Continued)

OTHER PUBLICATIONS

International Search Report to corresponding International Application No. PCT/CN2016/079027 dated Jul. 20, 2016.

*Primary Examiner* — Erika Washington
(74) *Attorney, Agent, or Firm* — James J. DeCarlo; Greenberg Traurig, LLP

(57) ABSTRACT

The disclosed embodiments describe mobile terminal unlocking methods, systems, and devices. In one embodiment, the method comprises: determining, by a wearable Bluetooth device, a current status corresponding to a mobile terminal after a connection with the mobile terminal is established by the wearable Bluetooth device, wherein the current status is one of a locked status or an unlocked status; detecting, by the wearable Bluetooth device, a user's authorization behavior, and setting a processing identification corresponding to the mobile terminal by using the user's authorization behavior, wherein the processing identification is one of a locking identification or an unlocking identification; and sending, by the wearable Bluetooth device an unlocking message to the mobile terminal causing the mobile terminal to execute an unlocking operation when the processing identification is the unlocking identification and the current status is the locked status. In the disclosed (Continued)

embodiments, the wearable Bluetooth device can execute an unlocking operation or a locking operation on a mobile terminal based on the volition of the owner of the mobile terminal (that is, the real intention of a user), thus improving user experience and effectively protecting user privacy.

18 Claims, 4 Drawing Sheets

(51) Int. Cl.
    *H04W 76/02*     (2009.01)
    *H04W 4/00*     (2018.01)
    *H04W 76/14*     (2018.01)
    *H04W 4/80*     (2018.01)

(52) U.S. Cl.
    CPC ......... *H04W 76/023* (2013.01); *H04W 76/14* (2018.02); *H04M 2250/12* (2013.01)

(56) References Cited

U.S. PATENT DOCUMENTS

| | | | |
|---|---|---|---|
| 9,032,337 | B2 | 5/2015 | Oh et al. |
| 9,173,052 | B2 | 10/2015 | Hauser et al. |
| 9,383,782 | B2 | 7/2016 | Kamijima |
| 9,544,774 | B2 | 1/2017 | Lee et al. |
| 9,549,323 | B2 | 1/2017 | Lee et al. |
| 9,734,318 | B2 | 8/2017 | Kim |
| 2007/0150842 | A1 | 6/2007 | Chaudhri et al. |
| 2009/0231960 | A1 | 9/2009 | Hutcheson |
| 2010/0001967 | A1 | 1/2010 | Yoo |
| 2014/0040622 | A1 | 2/2014 | Kendall et al. |
| 2014/0155031 | A1 | 6/2014 | Lee et al. |
| 2015/0022438 | A1 | 1/2015 | Hong |
| 2016/0042172 | A1 | 2/2016 | Chiplunkar et al. |
| 2016/0050308 | A1 | 2/2016 | Liu et al. |
| 2016/0119789 | A1 | 4/2016 | Hu et al. |
| 2016/0196420 | A1 | 7/2016 | Chen |
| 2016/0342784 | A1 | 11/2016 | Beveridge et al. |
| 2017/0091437 | A1 | 3/2017 | Lee et al. |

FOREIGN PATENT DOCUMENTS

| | | |
|---|---|---|
| CN | 103378876 A | 10/2013 |
| CN | 103853328 | 6/2014 |
| CN | 104200143 | 12/2014 |

MOBILE TERMINAL UNLOCKING METHOD AND DEVICE

CROSS-REFERENCE TO RELATED APPLICATIONS

This application claims priority to Chinese Patent Application No. 201510188757.2, filed on Apr. 20, 2015 and entitled "MOBILE TERMINAL UNLOCKING METHOD AND DEVICE", and PCT Application No. PCT/CN2016/079027, titled "MOBILE TERMINAL UNLOCKING METHOD AND DEVICE" filed on Apr. 12, 2016, the disclosure of each hereby incorporated by reference in their entirety.

BACKGROUND

Technical Field

The disclosure relates to the field of communication technologies, and in particular, to methods, devices, and systems for unlocking a mobile terminal.

Description of the Related Art

With the popularity of mobile terminals, for example, a medical worker can access a patient's medical and health data using a mobile terminal and the patient can access his own data as well. To protect private information on a mobile terminal, a user must perform lock the mobile terminal (e.g., via a locking operation) when it is not in use. Then, when the user uses the mobile terminal again, the user of mobile terminal will need to unlock the terminal (e.g., by performing an unlocking operation). The operations are relatively tedious for the user when the locking and unlocking operations are implemented through a password or a gesture.

With the growing popularity of wearable Bluetooth devices (e.g., athletic bracelets), a wearable Bluetooth device employed in current systems can transmit a user identification (often unique) by using a broadcast message of a broadcast channel to control the mobile terminal to implement locking and unlocking operations. When a wireless connection is established between the mobile terminal and the wearable Bluetooth device, the wearable Bluetooth device transmits a user identification (such as a Media Access Control (MAC) address) through a broadcast message on a broadcast channel. The mobile terminal then records the user identification of the wearable Bluetooth device included in the broadcast message by monitoring the broadcast message on the broadcast channel. Finally, a Bluetooth connection is established between the mobile terminal and the wearable Bluetooth device.

When the wearable Bluetooth device and the mobile terminal are separated by more than a preset distance (e.g., 10 meters), the Bluetooth connection between the wearable Bluetooth device and the mobile terminal may be interrupted. At this moment, the mobile terminal is locked. Furthermore, the wearable Bluetooth device may periodically broadcast the user identification of the wearable Bluetooth device on the broadcast channel, and the mobile terminal may periodically monitor the user identification of the wearable Bluetooth device on the broadcast channel. When the distance between the wearable Bluetooth device and the mobile terminal reaches a certain distance (e.g., less than 10 meters) again, the mobile terminal may monitor the user identification of the wearable Bluetooth device on the broadcast channel. If the monitored user identification is consistent with a user identification stored in the mobile terminal itself, a Bluetooth connection is again established between the mobile terminal and the wearable Bluetooth device, and the two can conduct data communication. At this moment, the mobile terminal is unlocked.

In the above manner, the unlocking operation and locking operation on a mobile terminal are implemented only according to the establishment and interruption of the Bluetooth connection between the wearable Bluetooth device and the mobile terminal, which may not be consistent with the intent of the user.

For example, when an owner of a mobile terminal wears a wearable Bluetooth device, and when the mobile terminal is within the coverage of a Bluetooth signal of the wearable Bluetooth device, an unlocking operation may be conducted on the mobile terminal. At this moment, another person can also log in to view medical and health data stored on the mobile terminal even if the owner of the mobile terminal does not intend to unlock the terminal (e.g., if the user is near the terminal, but not currently or intending to use the terminal). Thus, the unlocking operation executed on the mobile terminal when the mobile terminal is within the coverage of the Bluetooth signal of the wearable Bluetooth device is not the user's real intent.

BRIEF SUMMARY

The disclosed embodiments provide a mobile terminal unlocking method and device to execute an unlocking operation and a locking operation on a mobile terminal based on the real intention of a user. The disclosed embodiments thus improve user experience and increase the security of locking and unlocking operations as disclosed herein.

The disclosed embodiments provide a mobile terminal unlocking method comprising: determining, by a wearable Bluetooth device, a current status corresponding to a mobile terminal after a connection with the mobile terminal is established by the wearable Bluetooth device, wherein the current status is one of a locked status or an unlocked status; detecting, by the wearable Bluetooth device, a user's authorization behavior, and setting a processing identification corresponding to the mobile terminal by using the user's authorization behavior, wherein the processing identification is one of a locking identification or an unlocking identification; and sending, by the wearable Bluetooth device an unlocking message to the mobile terminal causing the mobile terminal to execute an unlocking operation when the processing identification is the unlocking identification and the current status is the locked status.

In one embodiment, detecting, by the wearable Bluetooth device, a user's authorization behavior, and setting a processing identification corresponding to the mobile terminal by using the user's authorization behavior comprises: determining the user's authorization behavior as an authorized unlocking behavior when the wearable Bluetooth device detects that a measurement value of an acceleration sensor of the wearable Bluetooth device is greater than a preset first threshold and setting the processing identification corresponding to the mobile terminal to the unlocking identification; or determining the user's authorization behavior as an authorized unlocking behavior when the wearable Bluetooth device detects that a measurement value of an angular velocity sensor of the wearable Bluetooth device is greater than a preset second threshold; and setting the processing identification corresponding to the mobile terminal to the unlocking identification.

In one embodiment, the method further comprises: starting, by the wearable Bluetooth device, an aging timer for the mobile terminal after the wearable Bluetooth device sets the processing identification corresponding to the mobile terminal to the unlocking identification; and setting, by the wearable Bluetooth device, the processing identification corresponding to the mobile terminal to the locking identification after the aging timer expires.

In one embodiment, detecting, by the wearable Bluetooth device, that a measurement value of an acceleration sensor of the wearable Bluetooth device is greater than a preset first threshold comprises: obtaining, by the wearable Bluetooth device, $ACC_x^2$, $ACC_y^2$, and $ACC_z^2$ by using the measurement value of the acceleration sensor, and detecting that the measurement value of the acceleration sensor of the wearable Bluetooth device is greater than the preset first threshold when $ACC_x^2+ACC_y^2+ACC_z^2$ is greater than the preset first threshold, wherein $ACC_x^2$ is the square of an acceleration intensity of the acceleration sensor in an X-axis direction, $ACC_y^2$ is the square of an acceleration intensity of the acceleration sensor in a Y-axis direction, and $ACC_z^2$ is the square of an acceleration intensity of the acceleration sensor in a Z-axis direction.

In one embodiment, determining, by a wearable Bluetooth device, a current status corresponding to a mobile terminal after a connection with the mobile terminal is established comprises: establishing, by the wearable Bluetooth device, a connection with the mobile terminal, receiving a locked status notification message from the mobile terminal after the connection is established, identifying the current status corresponding to the mobile terminal as the locked status based on the locked status notification message; receiving, by the wearable Bluetooth device, an unlocked status notification message from the mobile terminal after the mobile terminal executes the unlocking operation, and identifying the current status corresponding to the mobile terminal as the unlocked status based on the unlocked status notification message.

In one embodiment, sending, by the wearable Bluetooth device, an unlocking message to the mobile terminal causing the mobile terminal to execute an unlocking operation comprises: recording first timing information and first start timestamp information corresponding to the measurement value of the acceleration sensor of the wearable Bluetooth device after the wearable Bluetooth device sets the processing identification corresponding to the mobile terminal to the unlocking identification; sending the unlocking message to the mobile terminal, and sending to the mobile terminal a checking change request message including the first timing information and the first start timestamp information causing the mobile terminal to determine whether to execute the unlocking operation based on the first timing information and the first start timestamp information, and execute the unlocking operation when a result of the determination is positive.

In one embodiment, the method further comprises: sending, by the wearable Bluetooth device, a current status maintaining message to the mobile terminal causing the mobile terminal to maintain the locked status when the processing identification is the locking identification and the current status is the locked status.

In one embodiment, the method further comprises: sending, by the wearable Bluetooth device, an unlocking message to the mobile terminal causing the mobile terminal to execute the unlocking operation if the wearable Bluetooth device detects a user's voluntary status-changing behavior in the case when the processing identification is the locking identification and the current status is the locked status.

In one embodiment, the method further comprises: sending, by the wearable Bluetooth device, a locking message to the mobile terminal causing the mobile terminal to execute a locking operation if the wearable Bluetooth device detects a user's voluntary status-changing behavior in the case when the processing identification is the unlocking identification or the locking identification and the current status is the unlocked status.

In one embodiment, detecting, by the wearable Bluetooth device, a user's voluntary status-changing behavior comprises: determining that a user's voluntary status-changing behavior is detected at a current time when the wearable Bluetooth device detects that the measurement value of the acceleration sensor of the wearable Bluetooth device is greater than a preset third threshold; or, determining that a user's voluntary status-changing behavior is detected at a current time when the wearable Bluetooth device detects that the measurement value of the angular velocity sensor of the wearable Bluetooth device is greater than a preset fourth threshold.

The disclosed embodiments provide a mobile terminal unlocking method comprising: receiving, by a mobile terminal, an unlocking message from a wearable Bluetooth device, the unlocking message being sent when the wearable Bluetooth device determines a current status corresponding to the mobile terminal as a locked status and sets a processing identification corresponding to the mobile terminal to an unlocking identification through a user's authorization behavior, wherein the processing identification is a locking identification or the unlocking identification, and the current status is the locked status or an unlocked status; and executing, by the mobile terminal, an unlocking operation based on the unlocking message.

In one embodiment, the method further comprises: establishing, by the mobile terminal, a connection with the wearable Bluetooth device; sending a locked status notification message to the wearable Bluetooth device after the connection is established, the wearable Bluetooth device determining the current status corresponding to the mobile terminal as the locked status based on the locked status notification message; and sending, by the mobile terminal, an unlocked status notification message to the wearable Bluetooth device after the mobile terminal executes the unlocking operation based on the unlocking message, the wearable Bluetooth device determining the current status corresponding to the mobile terminal as the unlocked status based on the unlocked status notification message.

In one embodiment, receiving, by the mobile terminal, an unlocking message from a wearable Bluetooth device, and executing an unlocking operation based on the unlocking message comprises: receiving, by the mobile terminal, the unlocking message from the wearable Bluetooth device, and receiving a checking change request message including first timing information and first start timestamp information from the wearable Bluetooth device, wherein the first timing information and the first start timestamp information is first timing information and first start timestamp information that corresponds to a measurement value, recorded by the wearable Bluetooth device, of an acceleration sensor of the wearable Bluetooth device after the processing identification corresponding to the mobile terminal is set to the unlocking identification by the wearable Bluetooth device; recording, by the mobile terminal, second timing information and second start timestamp information corresponding to a measurement value of an acceleration sensor of the mobile terminal after the current status corresponding to the mobile terminal is determined as the locked status; determining, by the mobile terminal, whether to execute the unlocking operation based on the first timing information, the first start timestamp information, the second timing information, and the second start timestamp information; and executing, by the mobile terminal, the unlocking operation based on the unlocking message when a result of the determination is positive.

The first timing information is a first timing sequence (int-X1, int-X2, . . . , intXn) of a sum of the square of an acceleration intensity in an X-axis direction, the square of an acceleration intensity in a Y-axis direction, and the square of an acceleration intensity in a Z-axis direction of the measurement value of the acceleration sensor of the wearable Bluetooth device; and the second timing information is a second timing sequence (int-Y1, int-Y2, . . . , intYm) of a sum of the square of an acceleration intensity in the X-axis direction, the square of an acceleration intensity in the Y-axis direction, and the square of an acceleration intensity in the Z-axis direction of the measurement value of the acceleration sensor of the mobile terminal; and The step of determining, by the mobile terminal, whether to execute the unlocking operation based on the first timing information, the first start timestamp information, the second timing information, and the second start timestamp information comprises: aligning, by the mobile terminal, the first timing sequence and the second timing sequence by using the first start timestamp information and the second start timestamp information; calculating, by the mobile terminal, a correlation coefficient between the first timing sequence and the second timing sequence; and determining, by the mobile terminal, to execute the unlocking operation when the correlation coefficient meets a preset strategy, or, determining, by the mobile terminal, not to execute the unlocking operation.

In one embodiment, the method further comprises: receiving, by the mobile terminal, a current status maintaining message from the wearable Bluetooth device, wherein the current status maintaining message is sent by the wearable Bluetooth device when the processing identification corresponding to the mobile terminal is the locking identification and the current status corresponding to the mobile terminal is the locked status; and maintaining, by the mobile terminal, the locked status based on the current status maintaining message.

In one embodiment, the method further comprises: receiving, by the mobile terminal, the unlocking message from the wearable Bluetooth device, wherein the unlocking message is sent by the wearable Bluetooth device when the processing identification corresponding to the mobile terminal is the locking identification, the current status is the locked status, and a user's voluntary status-changing behavior is detected; and executing, by the mobile terminal, an unlocking operation based on the unlocking message.

In one embodiment, the method further comprises: receiving, by the mobile terminal, a locking message from the wearable Bluetooth device, wherein the locking message is sent by the wearable Bluetooth device when the processing identification corresponding to the mobile terminal is the unlocking identification or the locking identification, the current status is the unlocked status, and a user's voluntary status-changing behavior is detected; and executing, by the mobile terminal, a locking operation based on the locking message.

The disclosed embodiments provide a wearable Bluetooth device, and the wearable Bluetooth device comprises: a determining module, configured to determine a current status corresponding to a mobile terminal after a connection with the mobile terminal is established, wherein the current status is a locked status or an unlocked status; a setting module, configured to detect a user's authorization behavior, and set a processing identification corresponding to the mobile terminal by using the user's authorization behavior, wherein the processing identification is a locking identification or an unlocking identification; and a sending module, configured to send an unlocking message to the mobile terminal causing the mobile terminal to execute an unlocking operation when the processing identification is the unlocking identification and the current status is the locked status.

In one embodiment, the setting module is configured to determine the user's authorization behavior as an authorized unlocking behavior when it is detected that a measurement value of an acceleration sensor of the wearable Bluetooth device is greater than a preset first threshold, and set the processing identification corresponding to the mobile terminal to the unlocking identification; or determine the user's authorization behavior as an authorized unlocking behavior when it is detected that a measurement value of an angular velocity sensor of the wearable Bluetooth device is greater than a preset second threshold, and set the processing identification corresponding to the mobile terminal to the unlocking identification.

In one embodiment, the setting module is further configured to start an aging timer for the mobile terminal after the processing identification corresponding to the mobile terminal is set to the unlocking identification; and set the processing identification corresponding to the mobile terminal to the locking identification after the aging timer expires.

In one embodiment, the setting module is further configured to obtain $ACC_x^2$, $ACC_y^2$, and $ACC_z^2$ by using the measurement value of the acceleration sensor in the process of detecting that the measurement value of the acceleration sensor is greater than the preset first threshold; and detect that the measurement value of the acceleration sensor of the wearable Bluetooth device is greater than the preset first threshold when $ACC_x^2 + ACC_y^2 + ACC_z^2$ is greater than the preset first threshold, wherein $ACC_x^2$ is the square of an acceleration intensity of the acceleration sensor in an X-axis direction, $ACC_y^2$ is the square of an acceleration intensity of the acceleration sensor in a Y-axis direction, and $ACC_z^2$ is the square of an acceleration intensity of the acceleration sensor in a Z-axis direction.

In one embodiment, the determining module is configured to establish a connection with the mobile terminal; receive a locked status notification message from the mobile terminal after the connection is established, determine the current status corresponding to the mobile terminal as the locked status based on the locked status notification message; receive an unlocked status notification message from the mobile terminal after the mobile terminal executes the unlocking operation, and determine the current status corresponding to the mobile terminal as the unlocked status based on the unlocked status notification message.

In one embodiment, the sending module is configured to record first timing information and first start timestamp information corresponding to the measurement value of the acceleration sensor of the wearable Bluetooth device after the processing identification corresponding to the mobile terminal is set to the unlocking identification; send the unlocking message to the mobile terminal, and send to the mobile terminal a checking change request message including the first timing information and the first start timestamp information causing the mobile terminal to determine whether to execute the unlocking operation based on the first timing information and the first start timestamp information, and execute the unlocking operation when a result of the determination is positive.

In one embodiment, the sending module is further configured to send a current status maintaining message to the mobile terminal and the mobile terminal maintains the locked status when the processing identification is the locking identification and the current status is the locked status.

In one embodiment, the sending module is further configured to send an unlocking message to the mobile terminal causing the mobile terminal to execute the unlocking operation if the sending module detects a user's voluntary status-changing behavior in the case when the processing identification is the locking identification and the current status is the locked status.

In one embodiment, the sending module is further configured to send a locking message to the mobile terminal causing the mobile terminal to execute a locking operation if the sending module detects a user's voluntary status-changing behavior in the case when the processing identification is the unlocking identification or the locking identification and the current status is the unlocked status.

In one embodiment, the sending module is further configured to determine that a user's voluntary status-changing behavior is detected at a current time when it is detected that the measurement value of the acceleration sensor of the wearable Bluetooth device is greater than a preset third threshold when the user's voluntary status-changing behavior is detected; or determine that a user's voluntary status-changing behavior is detected at a current time when it is detected that the measurement value of the angular velocity sensor of the wearable Bluetooth device is greater than a preset fourth threshold.

The disclosed embodiments provide a mobile terminal, and the mobile terminal comprises: a receiving module, configured to receive an unlocking message from a wearable Bluetooth device, the unlocking message being sent when the wearable Bluetooth device determines a current status corresponding to the mobile terminal as a locked status, and sets a processing identification corresponding to the mobile terminal to an unlocking identification by using a user's authorization behavior, wherein the processing identification is a locking identification or the unlocking identification, and the current status is the locked status or an unlocked status; and a processing module, configured to execute an unlocking operation based on the unlocking message.

In one embodiment, the mobile terminal further comprises: a sending module, configured to establish a connection with the wearable Bluetooth device, and send a locked status notification message to the wearable Bluetooth device after the connection is established, the wearable Bluetooth device determining the current status corresponding to the mobile terminal as the locked status based on the locked status notification message; and send an unlocked status notification message to the wearable Bluetooth device after the processing module executes the unlocking operation based on the unlocking message, the wearable Bluetooth device determining the current status corresponding to the mobile terminal as the unlocked status based on the unlocked status notification message.

In one embodiment, the receiving module is configured to receive the unlocking message from the wearable Bluetooth device, and receive a checking change request message including first timing information and first start timestamp information from the wearable Bluetooth device, wherein the first timing information and the first start timestamp information is first timing information and first start timestamp information that corresponds to a measurement value, recorded by the wearable Bluetooth device, of an acceleration sensor of the wearable Bluetooth device after the processing identification corresponding to the mobile terminal is set to the unlocking identification by the wearable Bluetooth device; and the processing module is configured to record second timing information and second start timestamp information corresponding to a measurement value of an acceleration sensor of the mobile terminal after the current status corresponding to the mobile terminal is determined as the locked status; determine whether to execute the unlocking operation based on the first timing information, the first start timestamp information, the second timing information, and the second start timestamp information; and execute the unlocking operation based on the unlocking message when a result of the determination is positive.

In one embodiment, the first timing information is a first timing sequence (int-X1, int-X2, . . . , intXn) of a sum of the square of an acceleration intensity in an X-axis direction, the square of an acceleration intensity in a Y-axis direction, and the square of an acceleration intensity in a Z-axis direction of the measurement value of the acceleration sensor of the wearable Bluetooth device; and the second timing information is a second timing sequence (int-Y1, int-Y2, . . . , intYm) of a sum of the square of an acceleration intensity in the X-axis direction, the square of an acceleration intensity in the Y-axis direction, and the square of an acceleration intensity in the Z-axis direction of the measurement value of the acceleration sensor of the mobile terminal; and the processing module is further configured to align the first timing sequence and the second timing sequence by using the first start timestamp information and the second start timestamp information in the process of determining whether to execute the unlocking operation based on the first timing information, the first start timestamp information, the second timing information, and the second start timestamp information; calculate a correlation coefficient between the first timing sequence and the second timing sequence; and determine to execute the unlocking operation when the correlation coefficient meets a preset strategy, otherwise, determine to cancel the unlocking operation.

In one embodiment, the receiving module is further configured to receive a current status maintaining message from the wearable Bluetooth device, wherein the current status maintaining message is sent by the wearable Bluetooth device when the processing identification corresponding to the mobile terminal is the locking identification and the current status corresponding to the mobile terminal is the locked status; and the processing module is further configured to maintain the locked status based on the current status maintaining message.

In one embodiment, the receiving module is further configured to receive the unlocking message from the wearable Bluetooth device, wherein the unlocking message is sent by the wearable Bluetooth device when the processing identification corresponding to the mobile terminal is the locking identification, the current status is the locked status, and a user's voluntary status-changing behavior is detected; and the processing module is further configured to execute the unlocking operation based on the unlocking message.

In one embodiment, the receiving module is further configured to receive a locking message from the wearable Bluetooth device, wherein the locking message is sent by the wearable Bluetooth device when the processing identification corresponding to the mobile terminal is the unlocking identification or the locking identification, the current status is the unlocked status, and a user's voluntary status-changing behavior is detected; and the processing module is further configured to execute a locking operation based on the locking message.

Compared with current techniques, the disclosed embodiments have at least the following advantages: in the disclosed embodiments, the wearable Bluetooth device can execute an unlocking operation or a locking operation on a mobile terminal based on the volition of the owner of the mobile terminal (that is, the real intention of a user), thus improving user experience, effectively protecting user privacy, and effectively avoiding the risk of leaking the owner's private information. It is unnecessary for the user to conduct a manual operation on the wearable Bluetooth device, thereby making it convenient for the owner of the mobile terminal.

BRIEF DESCRIPTION OF THE DRAWINGS

In order to more clearly illustrate the technical solutions in the disclosed embodiments, the drawings required for describing the disclosed embodiments will be introduced briefly below. The drawings described below are merely some disclosed embodiments, and those of ordinary skill in the art can also obtain other drawings according to these drawings in the disclosed embodiments without making creative efforts.

DETAILED DESCRIPTION

The technical solutions in the disclosed embodiments will be described clearly and completely below with reference to the drawings. The described embodiments are merely some, rather than all, of the disclosed embodiments. Based on the disclosed embodiments, all other embodiments obtained by those of ordinary skill in the art without making creative efforts shall fall within the scope of the disclosure.

Embodiment 1

Figure 1:
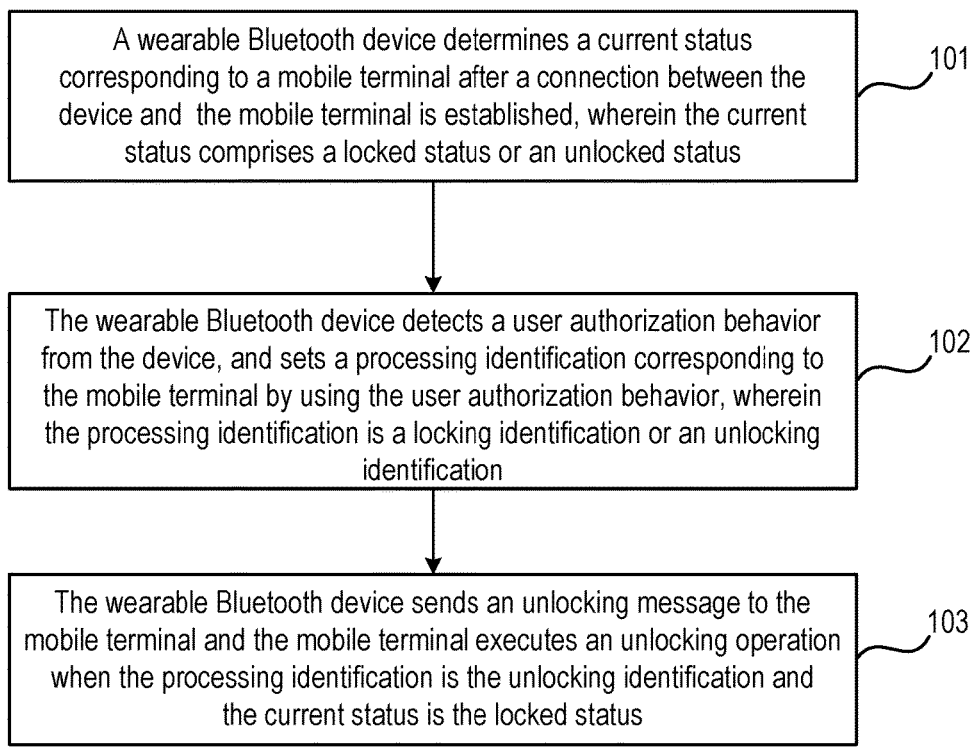
FIG. 1 is a flow diagram illustrating a mobile terminal unlocking method according to some embodiments of the disclosure.

To solve the mentioned problems in current systems, Embodiment 1 provides a unlocking method for a mobile terminal. As shown in FIG. 1, the mobile terminal unlocking method may include the following steps.

Step 101: A wearable Bluetooth device determines a current status corresponding to a mobile terminal after a connection between the device and the mobile terminal is established, wherein the current status comprises a locked status or an unlocked status. While references are made herein to a wearable Bluetooth device, other wireless devices may be used (e.g., non-wearable and/or non-Bluetooth) that perform similar functionality.

Step 102: The wearable Bluetooth device detects a user authorization behavior from the device, and sets a processing identification corresponding to the mobile terminal by using the user authorization behavior, wherein the processing identification is a locking identification or an unlocking identification.

Step 103: The wearable Bluetooth device transmits an unlocking message to the mobile terminal and the mobile terminal executes an unlocking operation, if the processing identification is the unlocking identification and the current status is the locked status.

In one embodiment, the process of detecting, by the wearable Bluetooth device, a user's authorization behavior and setting a processing identification corresponding to the mobile terminal through the user's authorization behavior may comprise determining the user's authorization behavior as an authorized unlocking behavior when the wearable Bluetooth device detects that a measurement value of an acceleration sensor of the wearable Bluetooth device is greater than a preset first threshold, and setting the processing identification corresponding to the mobile terminal to the unlocking identification.

Alternatively, or in conjunction with the foregoing embodiment, detecting a user's authorization behavior and setting a processing identification corresponding to the mobile terminal through the user's authorization behavior may comprise determining the user's authorization behavior as an authorized unlocking behavior when the wearable Bluetooth device detects that a measurement value of an angular velocity sensor of the wearable Bluetooth device is greater than a preset second threshold, and setting the processing identification corresponding to the mobile terminal to the unlocking identification. An acceleration sensor and an angular velocity sensor are referred to, collectively, as a motion sensor.

It is certain that in actual application, it is not limited to determine the user's authorization behavior as an authorized unlocking behavior by using the measurement value of the acceleration sensor or the measurement value of the angular velocity sensor. For example, it is also possible to determine the user's authorization behavior as an authorized unlocking behavior based on a measurement value of an audio, and other determining methods are not described in detail herein.

In one embodiment, the wearable Bluetooth device may further start an aging timer for the mobile terminal after the wearable Bluetooth device sets the processing identification corresponding to the mobile terminal to the unlocking identification, and the wearable Bluetooth device sets the processing identification corresponding to the mobile terminal to the locking identification after the aging timer expires.

In one embodiment, the process of detecting, by the wearable Bluetooth device, that a measurement value of an acceleration sensor of the wearable Bluetooth device is greater than a preset first threshold comprises obtaining $ACC_x^2$, $ACC_y^2$, and $ACC_z^2$ by the wearable Bluetooth device by using the measurement value of the acceleration sensor, and detecting that the measurement value of the acceleration sensor of the wearable Bluetooth device is greater than the preset first threshold when $ACC_x^2 + ACC_y^2 + ACC_z^2$ is greater than the preset first threshold, wherein $ACC_x^2$ is the square of an acceleration intensity of the acceleration sensor in an x-axis direction, $ACC_y^2$ is the square of an acceleration intensity of the acceleration sensor in a y-axis direction, and $ACC_z^2$ is the square of an acceleration intensity of the acceleration sensor in a z-axis direction.

In one embodiment, the process of determining, by the wearable Bluetooth device, a current status corresponding to a mobile terminal after a connection with the mobile terminal is established comprises establishing, by the wearable Bluetooth device, a connection with the mobile terminal, receiving, by the wearable Bluetooth device, a locked status notification message from the mobile terminal after the connection with the mobile terminal is established, and determining the current status corresponding to the mobile terminal as a locked status based on the locked status notification message. Furthermore, the wearable Bluetooth device receives an unlocked status notification message from the mobile terminal after the mobile terminal executes the unlocking operation, and determines the current status corresponding to the mobile terminal as the unlocked status based on the unlocked status notification message.

In one embodiment, the process of sending, by the wearable Bluetooth device, an unlocking message to the mobile terminal, the mobile terminal executing an unlocking operation comprises recording first timing information and first start timestamp information corresponding to the measurement value of the acceleration sensor of the wearable Bluetooth device after the wearable Bluetooth device sets the processing identification corresponding to the mobile terminal to the unlocking identification; sending the unlocking message to the mobile terminal, and sending to the mobile terminal a checking change request message including the first timing information and the first start timestamp information; the mobile terminal determining whether to execute the unlocking operation based on the first timing information and the first start timestamp information, and the mobile terminal executing the unlocking operation when the result of the determination is affirmative.

In one embodiment, the wearable Bluetooth device sends a current status maintaining message to the mobile terminal and the mobile terminal maintains the locked status when the processing identification is the locking identification and the current status is the locked status.

Furthermore, in one embodiment, the wearable Bluetooth device may send an unlocking message to the mobile terminal and the mobile terminal executes the unlocking operation if the wearable Bluetooth device detects a user's voluntary status-changing behavior in the case when the processing identification is the locking identification and the current status is the locked status.

In one embodiment, the wearable Bluetooth device sends a locking message to the mobile terminal and the mobile terminal executes a locking operation if the wearable Bluetooth device detects a user's voluntary status-changing behavior in the case when the processing identification is the unlocking identification or the locking identification and the current status is the unlocked status.

In one embodiment, the process of detecting, by the wearable Bluetooth device, a user's voluntary status-changing behavior comprises determining that a user's voluntary status-changing behavior is detected at a current time when the wearable Bluetooth device detects that the measurement value of the acceleration sensor of the wearable Bluetooth device is greater than a preset third threshold; or determining that a user's voluntary status-changing behavior is detected at a current time when the wearable Bluetooth device detects that the measurement value of the angular velocity sensor of the wearable Bluetooth device is greater than a preset fourth threshold. The preset third threshold is greater than the preset first threshold, and the preset fourth threshold is greater than the preset second threshold.

Compared with current techniques, the disclosed embodiments have at least the following advantages: the wearable Bluetooth device can execute an unlocking operation or a locking operation on a mobile terminal based on the volition of the owner of the mobile terminal (that is, the real intention of a user), thus improving user experience, effectively protecting user privacy, and effectively avoiding the risk of leaking the owner's private information. It is unnecessary for the user to conduct a manual operation on the wearable Bluetooth device, thereby making it convenient for the owner of the mobile terminal.

Embodiment 2

Figure 2:
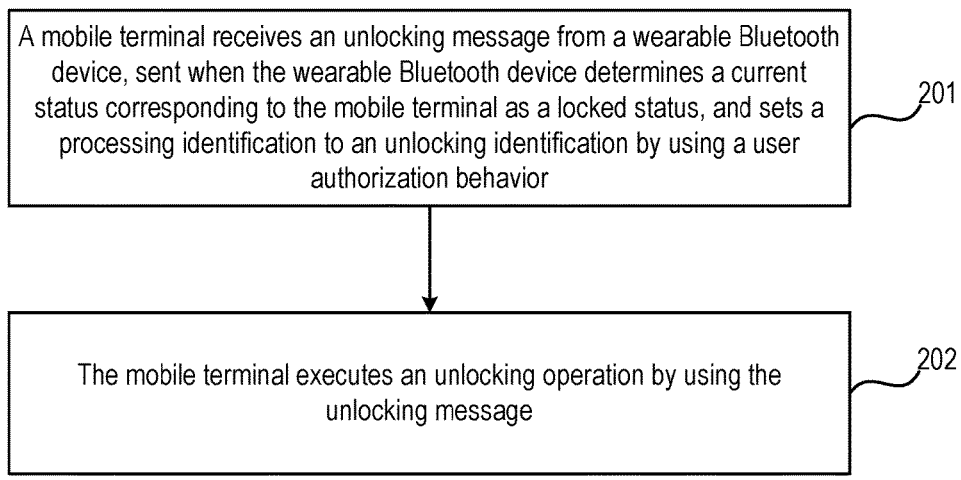
FIG. 2 is a flow diagram illustrating a mobile terminal unlocking method according to some embodiments of the disclosure.

Aiming to point out the problems in current techniques, Embodiment 2 provides a mobile terminal unlocking method. As shown in FIG. 2, the mobile terminal unlocking method may include the following steps.

Step 201: A mobile terminal receives an unlocking message from a wearable Bluetooth device, sent when the wearable Bluetooth device determines a current status corresponding to the mobile terminal as a locked status, and sets a processing identification to an unlocking identification by using a user's authorization behavior. In one embodiment, the processing identification is a locking identification or the unlocking identification, and the current status is the locked status or an unlocked status.

Step 202: The mobile terminal executes an unlocking operation based on the unlocking message.

In one embodiment, the mobile terminal establishes a connection with the wearable Bluetooth device, the mobile terminal sends a locked status notification message to the wearable Bluetooth device after the mobile terminal establishes the connection with the wearable Bluetooth device, and the wearable Bluetooth device determines the current status corresponding to the mobile terminal as the locked status based on the locked status notification message. Furthermore, the mobile terminal sends an unlocked status notification message to the wearable Bluetooth device after the mobile terminal executes the unlocking operation based on the unlocking message, and the wearable Bluetooth device determines the current status corresponding to the mobile terminal as the unlocked status based on the unlocked status notification message.

In one embodiment, the process of receiving, by the mobile terminal, an unlocking message from a wearable Bluetooth device and executing an unlocking operation based on the unlocking message comprises receiving, by the mobile terminal, the unlocking message from the wearable Bluetooth device, and receiving a checking change request message including first timing information and first start timestamp information from the wearable Bluetooth device, wherein the first timing information and the first start timestamp information is first timing information and first start timestamp information that corresponds to a measurement value, recorded by the wearable Bluetooth device, of an acceleration sensor of the wearable Bluetooth device after the processing identification corresponding to the mobile terminal is set to the unlocking identification by the wearable Bluetooth device. Furthermore, the mobile terminal records second timing information and second start timestamp information corresponding to a measurement value of an acceleration sensor of the mobile terminal after the current status corresponding to the mobile terminal is determined as the locked status. Thereafter, the mobile terminal judges whether to execute the unlocking operation based on the first timing information, the first start timestamp information, the second timing information, and the second start timestamp information; and the mobile terminal executes the unlocking operation based on the unlocking message when the result of the determination is affirmative.

In one embodiment, the first timing information is a first timing sequence (int-X1, int-X2, . . . , intXn) of a sum of the square of an acceleration intensity in an X-axis direction, the square of an acceleration intensity in a Y-axis direction, and the square of an acceleration intensity in a Z-axis direction of the measurement value of the acceleration sensor of the wearable Bluetooth device. The second timing information is a second timing sequence (int-Y1, int-Y2, . . . , intYm) of a sum of the square of an acceleration intensity in the X-axis direction, the square of an acceleration intensity in the Y-axis direction, and the square of an acceleration intensity in the Z-axis direction of the measurement value of the acceleration sensor of the mobile terminal.

Based on this, the process of determining, by the mobile terminal, whether to execute the unlocking operation based on the first timing information, the first start timestamp information, the second timing information, and the second start timestamp information comprises aligning, by the mobile terminal, the first timing sequence and the second timing sequence by using the first start timestamp information and the second start timestamp information. Furthermore, the mobile terminal calculates a correlation coefficient between the first timing sequence and the second timing sequence. The mobile terminal determines to execute the unlocking operation when the correlation coefficient meets a preset strategy, and the mobile terminal determines to cancel the unlocking operation when the correlation coefficient does not meet the preset strategy.

In one embodiment, the mobile terminal may further receive a current status maintaining message from the wearable Bluetooth device, wherein the current status maintaining message is sent by the wearable Bluetooth device when the processing identification corresponding to the mobile terminal is the locking identification and the current status corresponding to the mobile terminal is the locked status. Furthermore, the mobile terminal may maintain the locked status based on the current status maintaining message.

In one embodiment, the mobile terminal may further receive an unlocking message from the wearable Bluetooth device, wherein the unlocking message is sent by the wearable Bluetooth device when the processing identification corresponding to the mobile terminal is the locking identification, the current status is the locked status, and the wearable Bluetooth device detects a user's voluntary status-changing behavior. Furthermore, the mobile terminal may execute the unlocking operation based on the unlocking message.

In one embodiment, the mobile terminal may further receive a locking message from the wearable Bluetooth device, wherein the locking message is sent by the wearable Bluetooth device when the processing identification corresponding to the mobile terminal is the unlocking identification or the locking identification, the current status is the unlocked status, and the wearable Bluetooth device detects a user's voluntary status-changing behavior. Furthermore, the mobile terminal may execute a locking operation based on the locking message.

Compared with current techniques, the disclosed embodiments have at least the following advantages: the wearable Bluetooth device can execute an unlocking operation or a locking operation on a mobile terminal based on the volition of the owner of the mobile terminal (that is, the real intention of a user), thus improving user experience, effectively protecting user privacy, and effectively avoiding the risk of leaking the owner's private information. It is unnecessary for the user to conduct a manual operation on the wearable Bluetooth device; therefore, this provides conveniences for the owner of the mobile terminal.

The technical solution of the disclosed embodiments is illustrated in detail in combination with a specific application scenario.

In one embodiment, the wearable Bluetooth device may be an athletic bracelet, and the mobile terminal may be a device such as a mobile phone and/or a tablet. As an example, the wearable Bluetooth device and mobile terminal may be employed as part of a mobile medical application service, and may be used for protecting private information of a medical worker and a patient/user. Because an authorization behavior/intention for locking and unlocking is determined by an owner of a mobile terminal, the mobile terminal is notified automatically to conduct a corresponding locking operation or unlocking operation, thus effectively avoiding the risk of leaking the owner's private information. Meanwhile, the user does not need to conduct a manual operation on the wearable Bluetooth device, thus providing convenience for the user.

1. Composition of the wearable Bluetooth device (such as an athletic bracelet).

A Bluetooth communication module is configured to broadcast a unique identification (such as a MAC address) of the wearable Bluetooth device; establish a wireless connection with the mobile terminal; and conduct information interaction with the mobile terminal based on the wireless connection. A locked status module is configured to record a current status (such as a locked status (lock) or an unlocked status (unlock), or unknown by default) of the mobile terminal at a current time; and acquire the current status (lock or unlock) of the mobile terminal after a Bluetooth connection is established between the wearable Bluetooth device and the mobile terminal. An authorization sensing module is configured to recognize a user's authorization behavior based on a behavior (a movement behavior record) of the user as the corresponding movement behavior record may be generated on the wearable Bluetooth device when the owner of the mobile terminal intends to conduct an unlocking operation or a locking operation on the mobile terminal; and no corresponding movement behavior record is generated on the wearable Bluetooth device when an unknown user uses the mobile terminal. An authorization notification module is configured to send to the mobile terminal an authorization command for unlocking the mobile terminal (that is, an unlocking message) or an authorization command for locking the mobile terminal (that is, a locking message), according to status of the Bluetooth communication module and the authorization sensing module.

When recognizing the user's authorization behavior, the authorization sensing module may sense the recorded movement behavior of the user based on an acceleration sensor (such as a triaxial accelerometer) of the wearable Bluetooth device, thereby determining that the owner of the mobile terminal intends to authorize the unlocking operation or the locking operation. Alternatively, or in conjunction with the foregoing, the authorization sensing module may sense the recorded movement behavior of the user based on an angular velocity sensor (such as a gyroscope sensor) of the wearable Bluetooth device, thereby determining that the owner of the mobile terminal intends to authorize the unlocking operation or the locking operation. In actual applications, it is not limited to determine the user's authorization behavior as an authorized unlocking behavior by using the measurement value of the acceleration sensor or the measurement value of the angular velocity sensor. For example, it is also possible to determine the user's authorization behavior as an authorized unlocking behavior based on a measurement value of a sound sensor, and other determining methods are not described in detail herein.

A triaxial accelerometer is used herein as an example. The wearable Bluetooth device acquires measurements $ACC_x^2$, $ACC_y^2$, and $ACC_z^2$ (described herein) by using a measurement value of the triaxial accelerometer. When $ACC_x^2 + ACC_y^2 + ACC_z^2$ is greater than a preset threshold a, it indicates that the owner of the mobile terminal intends to authorize the unlocking operation. $ACC_x^2$ is the square of an acceleration intensity measured by the triaxial accelerometer in an X-axis direction, $ACC_y^2$ is the square of an acceleration intensity measured by the triaxial accelerometer in a Y-axis direction, and $ACC_z^2$ is the square of an acceleration intensity measured by the triaxial accelerometer in a Z-axis direction. Moreover, the preset threshold a is an intensity threshold according to experience or trained by using a classifier model or other machine learning technique.

2. The authorization sensing module of the wearable Bluetooth device. A user authorization intention/command is determined by detecting a user's authorization behavior, and a processing identification (a locking identification or an unlocking identification) corresponding to the mobile terminal is set.

Specifically, the authorization sensing module initially considers that the user intends to lock the mobile terminal, and sets the processing identification (lock_flag) corresponding to the mobile terminal to the locking identification (e.g., 1). When the authorization sensing module detects that a measurement value of the acceleration sensor or the angular velocity sensor is greater than a specific threshold a, the user's authorization behavior is determined as an authorized unlocking behavior, and the processing identification (lock_flag) corresponding to the mobile terminal is set to the unlocking identification (e.g., 0). Furthermore, the wearable Bluetooth device starts an aging timer for the mobile terminal; and the authorization sensing module sets the processing identification corresponding to the mobile terminal to 1 after the aging timer expires.

3. The mobile terminal implements the unlocking operation based on the user's authorization behavior detected by the wearable Bluetooth device.

Step 1: The mobile terminal establishes a connection with the wearable Bluetooth device. Before the mobile terminal establishes a connection with the wearable Bluetooth device, the mobile terminal has been successfully matched with the wearable Bluetooth device, and has stored a unique identification (such as a MAC address) of the wearable Bluetooth device as an unlocking identification.

Step 2: The mobile terminal sends a locked status notification message to the wearable Bluetooth device; the locked status notification message being used for notifying that a current status corresponding to the mobile terminal is the locked status (lock). After receiving the locked status notification information, the wearable Bluetooth device records the current status corresponding to the mobile terminal as the locked status.

Step 3: The wearable Bluetooth device queries the processing identification corresponding to the mobile terminal (the processing identification set based on the user's authorization behavior), the processing identification (lock_flag) being the locking identification or the unlocking identification.

Step 4: The wearable Bluetooth device sends an unlocking message to the mobile terminal if the processing identification corresponding to the mobile terminal is the unlocking identification, the unlocking message being used for notifying the mobile terminal to execute the unlocking operation. The wearable Bluetooth device sends a current status maintaining message to the mobile terminal if the processing identification corresponding to the mobile terminal is the locking identification, the current status maintaining message being used for notifying the mobile terminal to maintain the current status.

Step 5: The mobile terminal receives the unlocking message from the wearable Bluetooth device, and then executes the unlocking operation. The mobile terminal receives the current status maintaining message from the wearable Bluetooth device, and then maintains the locked status.

Step 6: The mobile terminal may further send an unlocked status notification message to the wearable Bluetooth device after the mobile terminal executes the unlocking operation, the unlocked status notification message being used for notifying that a current status corresponding to the mobile terminal is the unlocked status (unlock). Furthermore, after receiving the unlocked status notification information, the wearable Bluetooth device records the current status corresponding to the mobile terminal as the unlocked status (unlock).

4. The mobile terminal implements the unlocking operation based on the user's authorization behavior detected by the wearable Bluetooth device.

Step 1: The mobile terminal establishes a connection with the wearable Bluetooth device. Before the mobile terminal establishes a connection with the wearable Bluetooth device, the mobile terminal has been successfully matched with the wearable Bluetooth device, and has stored a unique identification (such as a MAC address) of the wearable Bluetooth device as an unlocking identification.

Step 2: The mobile terminal sends a locked status notification message to the wearable Bluetooth device, the locked status notification message being used for notifying that a current status corresponding to the mobile terminal is the locked status (lock). After receiving the locked status notification information, the wearable Bluetooth device records the current status corresponding to the mobile terminal as the locked status.

Step 3: The wearable Bluetooth device queries the processing identification corresponding to the mobile terminal (the processing identification set based on the user's authorization behavior), the processing identification (lock_flag) being the locking identification or the unlocking identification.

Step 4: The wearable Bluetooth device sends a current status maintaining message to the mobile terminal if the processing identification corresponding to the mobile terminal is the locking identification, the current status maintaining message being used for notifying the mobile terminal to maintain the current status. If the processing identification corresponding to the mobile terminal is the unlocking identification, the wearable Bluetooth device notifies the mobile terminal to check an unlocking behavior, records first timing information and first start timestamp information Timestamp1 corresponding to the measurement value of the acceleration sensor of the wearable Bluetooth device, sends the unlocking message to the mobile terminal, and sends to the mobile terminal a checking change request message including the first timing information and the first start timestamp information. The first timing information is a first timing sequence (int-X1, int-X2, . . . , intXn) of a sum of the square of an acceleration intensity in an X-axis direction, the square of an acceleration intensity in a Y-axis direction, and the square of an acceleration intensity in a Z-axis direction of the measurement value of the acceleration sensor of the wearable Bluetooth device.

Step 5: The mobile terminal receives the current status maintaining message from the wearable Bluetooth device, and then maintains the locked status. After receiving, from the wearable Bluetooth device, a notification of checking an unlocking behavior, the mobile terminal records second timing information and second start timestamp information Timestamp2 corresponding to the measurement value of the acceleration sensor of the mobile terminal. The second timing information is a second timing sequence (int-Y1, int-Y2, ..., intYm) of a sum of the square of an acceleration intensity in the X-axis direction, the square of an acceleration intensity in the Y-axis direction, and the square of an acceleration intensity in the Z-axis direction of the measurement value of the acceleration sensor of the mobile terminal.

Step 6: After receiving the checking change request message from the wearable Bluetooth device, the mobile terminal aligns the first timing sequence (int-X1, int-X2, ..., intXn) with the second timing sequence (int-Y1, int-Y2, ..., intYm), that is, aligns an X sequence {x1, ... xn} with a Y sequence {y1, ... yn—} by using the first start timestamp information Timestamp1 and the second start timestamp information Timestamp2. The mobile terminal calculates a correlation coefficient between the first timing sequence (X sequence) and the second timing sequence (Y sequence). The mobile terminal determines to execute the unlocking operation and send an unlocked status notification message to the wearable Bluetooth device when the correlation coefficient meets a preset strategy (for example, approximates to 1), the unlocked status notification message being used for notifying that a current status corresponding to the mobile terminal is the unlocked status (unlock). After receiving the unlocked status notification message, the wearable Bluetooth device records the current status corresponding to the mobile terminal as the unlocked status (unlock). The mobile terminal determines not to execute the unlocking operation when the correlation coefficient does not meet the preset strategy.

When the mobile terminal calculates the correlation coefficient between the first timing sequence (X sequence) and the second timing sequence (Y sequence), a calculation formula thereof may include, but is not limited to:

$$r = \frac{\sum_{i=1}^{n}(x_i - \bar{x})(y_i - \bar{y})}{\sqrt{\sum_{i=1}^{n}(x_i - \bar{x})^2 \cdot \sum_{i=1}^{n}(y_i - \bar{y})^2}}.$$

In view of the above, when the wearable Bluetooth device determines whether an authorized unlocking behavior occurs by using the measurement value of the acceleration sensor or the angular velocity sensor and the specific threshold a, it may be difficult to accurately obtain a broadly applicable specific threshold a by training because of different behavioral habits of different users. Therefore, the above technical solution according to the disclosed embodiments considers that when the user unlocks the mobile terminal by using the wearable Bluetooth device, movement tracks and movement modes of the wearable Bluetooth device and the mobile terminal in a period of time will be correlated. Therefore, the mobile terminal may further accurately check the unlocking operation on the mobile terminal by calculating the correlation coefficient between the first timing sequence (X sequence) and the second timing sequence (Y sequence).

5. The mobile terminal implements the unlocking operation based on mandatory status-changing of the wearable Bluetooth device.

When the user unlocks the mobile terminal by using the wearable Bluetooth device, the authorization behavior may not be detected by the wearable Bluetooth device because a movement amplitude is too small. In this case, the unlocking operation on the mobile terminal may be implemented by using a mandatory changing authorization detection function of the wearable Bluetooth device from the locked status to the unlocked status.

Step 1: The mobile terminal establishes a connection with the wearable Bluetooth device. Before the mobile terminal establishes a connection with the wearable Bluetooth device, the mobile terminal has been successfully matched with the wearable Bluetooth device, and has stored a unique identification (such as a MAC address) of the wearable Bluetooth device as an unlocking identification.

Step 2: The mobile terminal sends a locked status notification message to the wearable Bluetooth device, the locked status notification message being used for notifying that a current status corresponding to the mobile terminal is the locked status (lock). After receiving the locked status notification information, the wearable Bluetooth device records the current status corresponding to the mobile terminal as the locked status.

Step 3: The wearable Bluetooth device queries the processing identification corresponding to the mobile terminal (the processing identification set based on the user's authorization behavior), the processing identification (lock_flag) being the locking identification or the unlocking identification.

Step 4: The wearable Bluetooth device sends a current status maintaining message to the mobile terminal if the processing identification corresponding to the mobile terminal is the locking identification, the current status maintaining message being used for notifying the mobile terminal to maintain the current status. The mobile terminal receives the current status maintaining message, and then maintains the locked status.

Step 5: The wearable Bluetooth device sends an unlocking message to the mobile terminal when the wearable Bluetooth device detects a user's voluntary status-changing behavior, the unlocking message being used for notifying the mobile terminal to execute the unlocking operation. The mobile terminal receives the unlocking message from the wearable Bluetooth device, and then executes the unlocking operation. The process of detecting, by the wearable Bluetooth device, a user's voluntary status-changing behavior includes: determining that a user's voluntary status-changing behavior is detected at a current time when the wearable Bluetooth device detects that the measurement value of the acceleration sensor or the angular velocity sensor of the wearable Bluetooth device is greater than a specific threshold b. The specific threshold b is much greater than the specific threshold a, so as to avoid toggling between the locked status and the unlocked status.

Step 6: The mobile terminal may further send an unlocked status notification message to the wearable Bluetooth device after the mobile terminal executes the unlocking operation, the unlocked status notification message being used for notifying that a current status corresponding to the mobile terminal is the unlocked status (unlock). Furthermore, after receiving the unlocked status notification information, the wearable Bluetooth device records the current status corresponding to the mobile terminal as the unlocked status (unlock).

6. The mobile terminal implements the locking operation based on mandatory status changing of the wearable Bluetooth device.

When a stranger attempts to unlock the mobile terminal, because of the movement of the wearable Bluetooth device, the stranger may implement the unlocking operation on the mobile terminal when the owner of the mobile terminal does not authorize activity. In this case, the mandatory locking operation on the mobile terminal may be implemented by using a mandatory changing authorization detection function of the wearable Bluetooth device so that the status is changed from the unlocked status to the locked status. Furthermore, the mandatory changing from the unlocked status to the locked status may be implemented by mandatory status changing behavior detection at any moment after a Bluetooth connection is established between the mobile terminal and the wearable Bluetooth device.

Step 1: The mobile terminal establishes a connection with the wearable Bluetooth device. Before the mobile terminal establishes a connection with the wearable Bluetooth device, the mobile terminal has been successfully matched with the wearable Bluetooth device, and has stored a unique identification (such as a MAC address) of the wearable Bluetooth device as an unlocking identification.

Step 2: The wearable Bluetooth device detects a user's voluntary status-changing behavior. The process of detecting, by the wearable Bluetooth device, a user's voluntary status-changing behavior includes: determining that a user's voluntary status-changing behavior is detected at a current time when the wearable Bluetooth device detects that the measurement value of the acceleration sensor or the angular velocity sensor of the wearable Bluetooth device is greater than a specific threshold b. The specific threshold b is much greater than the specific threshold a, so as to avoid toggling between the locked status and the unlocked status.

Step 3: The wearable Bluetooth device queries a current status of the mobile terminal at a current time. Furthermore, if the current status of the mobile terminal is the unlocked status (unlock), the wearable Bluetooth device can send a locking message to the mobile terminal, and the locking message is used for notifying the mobile terminal to execute the locking operation. If the current status of the mobile terminal is the locked status (lock), the wearable Bluetooth device can send an unlocking message to the mobile terminal, and the unlocking message is used for notifying the mobile terminal to execute the unlocking operation.

Step 4: The mobile terminal receives the locking message from the wearable Bluetooth device, and then executes the locking operation. The mobile terminal receives the unlocking message from the wearable Bluetooth device, and then executes the unlocking operation.

Step 5: The mobile terminal sends a locked status notification message to the wearable Bluetooth device after the mobile terminal executes the locking operation, the locked status notification message being used for notifying that a current status corresponding to the mobile terminal is the locked status (lock). After receiving the locked status notification information, the wearable Bluetooth device records the current status corresponding to the mobile terminal as the locked status (lock). The mobile terminal sends an unlocked status notification message to the wearable Bluetooth device after the mobile terminal executes the unlocking operation, the unlocked status notification message being used for notifying that a current status corresponding to the mobile terminal is the unlocked status (unlock). After receiving the unlocked status notification information, the wearable Bluetooth device records the current status corresponding to the mobile terminal as the unlocked status (unlock).

Embodiment 3

Figure 3:
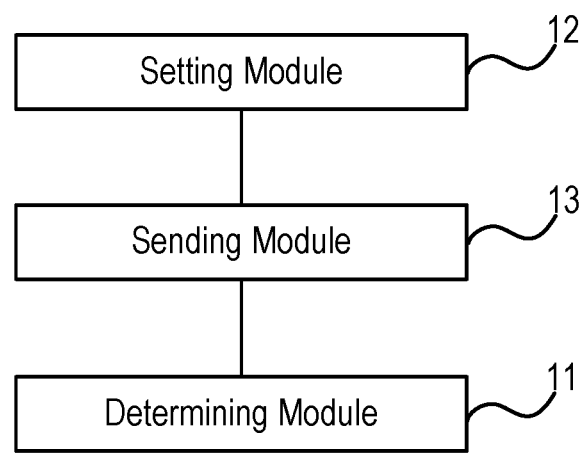
FIG. 3 is a logical block diagram of a wearable Bluetooth device according to some embodiments of the disclosure.

The disclosure further provides a wearable Bluetooth device based on the application conception the same as that in the above method. As shown in FIG. 3, the wearable Bluetooth device includes the following modules.

A determining module 11 is configured to determine a current status corresponding to a mobile terminal after a connection with the mobile terminal is established, wherein the current status is a locked status or an unlocked status;

A setting module 12 is configured to detect a user's authorization behavior, and set a processing identification corresponding to the mobile terminal by using the user's authorization behavior, wherein the processing identification is a locking identification or an unlocking identification.

A sending module 13 is configured to send an unlocking message to the mobile terminal when the processing identification is the unlocking identification and the current status is the locked status, the mobile terminal executing an unlocking operation.

The setting module 12 is configured to identify the user's authorization behavior as an authorized unlocking behavior when it is detected that a measurement value of an acceleration sensor of the wearable Bluetooth device is greater than a preset first threshold, and set the processing identification corresponding to the mobile terminal to the unlocking identification. Alternatively, or in conjunction with the foregoing, the setting module 12 is configured to identify the user's authorization behavior as an authorized unlocking behavior when it is detected that a measurement value of an angular velocity sensor of the wearable Bluetooth device is greater than a preset second threshold, and set the processing identification corresponding to the mobile terminal to the unlocking identification.

The setting module 12 is further configured to start an aging timer for the mobile terminal after the processing identification corresponding to the mobile terminal is set to the unlocking identification; and set the processing identification corresponding to the mobile terminal to the locking identification after the aging timer expires.

The setting module 12 is further configured to obtain $ACC_x^2$, $ACC_y^2$, and $ACC_z^2$ by using the measurement value of the acceleration sensor in the process of detecting that the measurement value of the acceleration sensor is greater than the preset first threshold, and detect that the measurement value of the acceleration sensor of the wearable Bluetooth device is greater than the preset first threshold when $ACC_x^2 + ACC_y^2 + ACC_z^2$ is greater than the preset first threshold, wherein $ACC_x^2$ is the square of an acceleration intensity of the acceleration sensor in an X-axis direction, $ACC_y^2$ is the square of an acceleration intensity of the acceleration sensor in a Y-axis direction, and $ACC_z^2$ is the square of an acceleration intensity of the acceleration sensor in a Z-axis direction.

The determining module 11 is configured to establish a connection with the mobile terminal, receive a locked status notification message from the mobile terminal after the connection is established, and determine the current status corresponding to the mobile terminal as the locked status based on the locked status notification message; receive an unlocked status notification message from the mobile terminal after the mobile terminal executes the unlocking operation, and determine the current status corresponding to the mobile terminal as the unlocked status based on the unlocked status notification message.

The sending module 13 is configured to record first timing information and first start timestamp information corresponding to the measurement value of the acceleration sensor of the wearable Bluetooth device after the processing identification corresponding to the mobile terminal is set to the unlocking identification, send the unlocking message to the mobile terminal, and send to the mobile terminal a checking change request message including the first timing information and the first start timestamp information; the mobile terminal determining whether to execute the unlocking operation based on the first timing information and the first start timestamp information, and the mobile terminal executing the unlocking operation when the result of the determination is affirmative.

The sending module 13 is further configured to send a current status maintaining message to the mobile terminal and the mobile terminal maintains the locked status when the processing identification is the locking identification and the current status is the locked status.

The sending module 13 is further configured to send an unlocking message to the mobile terminal and the mobile terminal executes the unlocking operation if the sending module detects a user's voluntary status-changing behavior in the case when the processing identification is the locking identification and the current status is the locked status.

The sending module 13 is further configured to send a locking message to the mobile terminal and the mobile terminal executes a locking operation if the sending module detects a user's voluntary status-changing behavior in the case when the processing identification is the unlocking identification or the locking identification and the current status is the unlocked status.

The sending module 13 is further configured to determine that a user's voluntary status-changing behavior is detected at a current time when it is detected that the measurement value of the acceleration sensor of the wearable Bluetooth device is greater than a preset third threshold when the user's voluntary status-changing behavior is detected; or determine that a user's voluntary status-changing behavior is detected at a current time when it is detected that the measurement value of the angular velocity sensor of the wearable Bluetooth device is greater than a preset fourth threshold.

The modules in the apparatus of the disclosure may be integrated into one body or deployed separately. The aforementioned modules may be combined into one module or further divided into multiple submodules.

Embodiment 4

Figure 4:
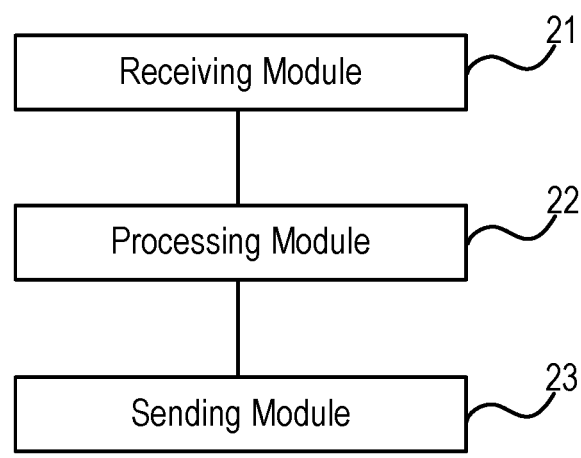
FIG. 4 is a logical block diagram of a mobile terminal according to some embodiments of the disclosure.

The disclosure further provides a mobile terminal based on the application conception the same as that in the above method. As shown in FIG. 4, the mobile terminal includes the following modules.

A receiving module 21 is configured to receive an unlocking message from a wearable Bluetooth device, the unlocking message being sent when the wearable Bluetooth device determines a current status corresponding to the mobile terminal as a locked status, and sets a processing identification corresponding to the mobile terminal to an unlocking identification by using a user's authorization behavior, wherein the processing identification is a locking identification or the unlocking identification, and the current status is the locked status or an unlocked status; and a processing module 22, configured to execute an unlocking operation based on the unlocking message.

The mobile terminal further includes a sending module 23, configured to establish a connection with the wearable Bluetooth device, and send a locked status notification message to the wearable Bluetooth device after the connection is established, the wearable Bluetooth device determining the current status corresponding to the mobile terminal as the locked status based on the locked status notification message; and send an unlocked status notification message to the wearable Bluetooth device after the processing module executes the unlocking operation based on the unlocking message, the wearable Bluetooth device determining the current status corresponding to the mobile terminal as the unlocked status based on the unlocked status notification message.

The receiving module 21 is configured to receive the unlocking message from the wearable Bluetooth device, and receive a checking change request message including first timing information and first start timestamp information from the wearable Bluetooth device, wherein the first timing information and the first start timestamp information are first timing information and first start timestamp information corresponding to a measurement value of an acceleration sensor of the wearable Bluetooth device that are recorded by the wearable Bluetooth device after the processing identification corresponding to the mobile terminal is set to the unlocking identification; and the processing module 22 is configured to record second timing information and second start timestamp information corresponding to a measurement value of an acceleration sensor of the mobile terminal after the current status corresponding to the mobile terminal is determined as the locked status; judge whether to execute the unlocking operation based on the first timing information, the first start timestamp information, the second timing information, and the second start timestamp information; and execute the unlocking operation based on the unlocking message when the result of the determination is affirmative.

The first timing information is a first timing sequence (int-X1, int-X2, . . . , intXn) of a sum of the square of an acceleration intensity in an X-axis direction, the square of an acceleration intensity in a Y-axis direction, and the square of an acceleration intensity in a Z-axis direction of the measurement value of the acceleration sensor of the wearable Bluetooth device; and the second timing information is a second timing sequence (int-Y1, int-Y2, . . . , intYm) of a sum of the square of an acceleration intensity in the X-axis direction, the square of an acceleration intensity in the Y-axis direction, and the square of an acceleration intensity in the Z-axis direction of the measurement value of the acceleration sensor of the mobile terminal; and the processing module 22 is further configured to align the first timing sequence and the second timing sequence by using the first start timestamp information and the second start timestamp information in the process of determining whether to execute the unlocking operation, based on the first timing information, the first start timestamp information, the second timing information, and the second start timestamp information; calculate a correlation coefficient between the first timing sequence and the second timing sequence; and determine to execute the unlocking operation when the correlation coefficient meets a preset strategy, otherwise, determine to cancel the unlocking operation.

The receiving module 21 is further configured to receive a current status maintaining message from the wearable Bluetooth device, wherein the current status maintaining message is sent by the wearable Bluetooth device when the processing identification corresponding to the mobile terminal is the locking identification and the current status corresponding to the mobile terminal is the locked status; and the processing module 22 is further configured to maintain the locked status based on the current status maintaining message.

The receiving module 21 is further configured to receive an unlocking message from the wearable Bluetooth device, wherein the unlocking message is sent by the wearable Bluetooth device when the processing identification corresponding to the mobile terminal is the locking identification, the current status is the locked status, and a user's voluntary status-changing behavior is detected; and the processing module 22 is further configured to execute the unlocking operation based on the unlocking message.

The receiving module 21 is further configured to receive a locking message from the wearable Bluetooth device, wherein the locking message is sent by the wearable Bluetooth device when the processing identification corresponding to the mobile terminal is the unlocking identification or the locking identification, the current status is the unlocked status, and a user's voluntary status-changing behavior is detected; and the processing module 22 is further configured to execute the locking operation based on the locking message.

The modules in the apparatus of the disclosure may be integrated into one body or deployed separately. The aforementioned modules may be combined into one module or further divided into multiple submodules.

Through the preceding description of the embodiments, those skilled in the art can clearly understand that the disclosed embodiments may be implemented by software plus a necessary general hardware platform; and certainly may also be implemented by hardware. In most cases, however, the former is a preferred implementation mode. Based on such understanding, the essence of the technical solutions of the disclosure or the part that makes contributions to the prior art may be embodied in the form of a software product. The computer software product is stored in a storage medium and includes several instructions for instructing a computer device (which may be a personal computer, a server, a network device, or the like) to perform the methods described in the disclosed embodiments. Those skilled in the art can understand that the accompanying drawings are merely schematic views of a preferred embodiment, and modules or processes in the accompanying drawings are not necessarily required in implementing the disclosed embodiments. Those skilled in the art can understand that modules in an apparatus in an embodiment may be distributed in the apparatus of the embodiment according to the description of the embodiment, or may be correspondingly changed to be disposed in one or more apparatuses different from this embodiment. The modules in the aforementioned embodiment may be combined into one module or further divided into multiple submodules. The aforementioned sequence numbers of the disclosed embodiments are merely for the convenience of description, and do not imply the preference among the embodiments. Disclosed above are merely several specific disclosed embodiments. However, the disclosure should not be limited to these embodiments, and any of variations thereof that can be contemplated by those skilled in the art should fall within the scope of the disclosure.

What is claimed is:

1. A method comprising:
   establishing a connection between a device and a mobile terminal;
   determining a current status of the mobile terminal, the current status comprising one of a locked status or unlocked status;
   detecting a user authorization behavior from the device, the detecting a user authorization behavior comprising:
      calculating squares of acceleration values recorded for each axis recorded by a motion sensor,
      calculating a sum of the squares of the acceleration values, and
      setting the processing identification as an unlocking identification if the sum exceeds a preset threshold;
   setting a processing identification based on the user authorization behavior, the processing identification comprising one of a locking identification or an unlocking identification; and
   transmitting an unlocking message to the mobile terminal if the processing identification is an unlocking identification and the current status is a locked status, the unlocking message causing the mobile device to execute an unlocking operation.

2. The method of claim 1, further comprising:
   starting an aging timer after setting the processing identification as an unlocking identification; and
   setting the processing identification as a locking identification when the aging timer expires.

3. The method of claim 1, wherein the motion sensor comprises a triaxial acceleration sensor.

4. The method of claim 1, wherein transmitting an unlocking message to the mobile terminal comprises:
   recording first timing information and first start timestamp information corresponding to a measurement value of a motion sensor;
   sending the unlocking message to the mobile terminal; and
   sending to the mobile terminal a checking-change request message including the first timing information and the first start timestamp information, causing the mobile terminal to determine whether to execute the unlocking operation based on the first timing information and the first start timestamp information and execute the unlocking operation when a result of the determination is positive.

5. The method of claim 4, wherein sending to the mobile terminal a checking-change request message further comprises:
   recording, at the mobile terminal, second timing information and second start timestamp information corresponding to the measurement value of the motion sensor;
   aligning the first timing information with the second timing information using the first start timestamp information and second start timestamp information;
   calculating a correlation coefficient between the first timing information with the second timing information; and
   executing the unlocking operation when the correlation coefficient meets a preset strategy.

6. The method of claim 1, further comprising:
   detecting a user's voluntary status-changing behavior;
   sending an unlocking messages to the mobile terminal if the processing identification is a locking identification and the current status is a locked status; and
   sending a locking messages to the mobile terminal if the processing identification is an unlocking identification and the current status is an unlocked status.

7. The method of claim 6, wherein detecting a user's voluntary status-changing behavior comprises determining that a user's voluntary status-changing behavior is detected at a current time when a measurement value of a motion sensor is greater than a preset threshold.

8. The method of claim 1, further comprising sending a current status maintaining message to the mobile terminal causing the mobile terminal to maintain the locked status when the processing identification is the locking identification and the current status is the locked status.

9. A device comprising:
a processor; and
a non-transitory memory storing computer-executable instructions therein that, when executed by the processor, cause the device to perform the operations of:
establishing a connection between the device and a mobile terminal;
determining a current status of the mobile terminal, the current status comprising one of a locked status or unlocked status;
detecting a user authorization behavior from the device, the detecting a user authorization behavior comprising:
calculating squares of acceleration values recorded for each axis recorded by a motion sensor,
calculating a sum of the squares of the acceleration values, and
setting the processing identification as an unlocking identification if the sum exceeds a preset threshold;
setting a processing identification based on the user authorization behavior, the processing identification comprising one of a locking identification or an unlocking identification; and
transmitting an unlocking message to the mobile terminal if the processing identification is an unlocking identification and the current status is a locked status, the unlocking message causing the mobile device to execute an unlocking operation.

10. The device of claim 9, wherein detecting a user authorization behavior comprises:
receiving and processing measurement values from a motion sensor; and
setting the processing identification as an unlocking identification if the measurement values exceed a preset threshold.

11. The device of claim 9, wherein the motion sensor comprises a triaxial acceleration sensor.

12. The device of claim 9, wherein transmitting an unlocking message to the mobile terminal comprises:
recording first timing information and first start timestamp information corresponding to a measurement value of a motion sensor;
sending the unlocking message to the mobile terminal; and
sending to the mobile terminal a checking-change request message including the first timing information and the first start timestamp information, causing the mobile terminal to determine whether to execute the unlocking operation based on the first timing information and the first start timestamp information and execute the unlocking operation when a result of the determination is positive.

13. The device of claim 12, wherein sending to the mobile terminal a checking-change request message further comprises:

recording, at the mobile terminal, second timing information and second start timestamp information corresponding to the measurement value of the motion sensor;
aligning the first timing information with the second timing information using the first start timestamp information and second start timestamp information;
calculating a correlation coefficient between the first timing information with the second timing information; and
executing the unlocking operation when the correlation coefficient meets a preset strategy.

14. The device of claim 9, wherein the instructions further cause the device to perform the operations of:
detecting a user's voluntary status-changing behavior;
sending an unlocking message to the mobile terminal if the processing identification is a locking identification and the current status is a locked status; and
sending a locking message to the mobile terminal if the processing identification is an unlocking identification and the current status is an unlocked status.

15. The device of claim 14, wherein detecting a user's voluntary status-changing behavior comprises determining that a user's voluntary status-changing behavior is detected at a current time when a measurement value of a motion sensor is greater than a preset threshold.

16. The device of claim 9, wherein the instructions further cause the device to perform the operations of sending a current status maintaining message to the mobile terminal causing the mobile terminal to maintain the locked status when the processing identification is the locking identification and the current status is the locked status.

17. A system comprising:
a mobile terminal; and
a wireless device configured to:
establish a connection between the wireless device and the mobile terminal;
determine a current status of the mobile terminal, the current status comprising one of a locked status or unlocked status;
detect a user authorization behavior from the wireless device, the detecting a user authorization behavior comprising:
calculating squares of acceleration values recorded for each axis recorded by a motion sensor,
calculating a sum of the squares of the acceleration values, and
setting the processing identification as an unlocking identification if the sum exceeds a preset threshold;
set a processing identification based on the user authorization behavior, the processing identification comprising one of a locking identification or an unlocking identification; and
transmit an unlocking message to the mobile terminal if the processing identification is an unlocking identification and the current status is a locked status, the unlocking message causing the mobile device to execute an unlocking operation.

18. The system of claim 17, wherein detecting a user authorization behavior comprises:
receiving and processing measurement values from a motion sensor; and
setting the processing identification as an unlocking identification if the measurement values exceed a preset threshold.

* * * * *